Figure 1:
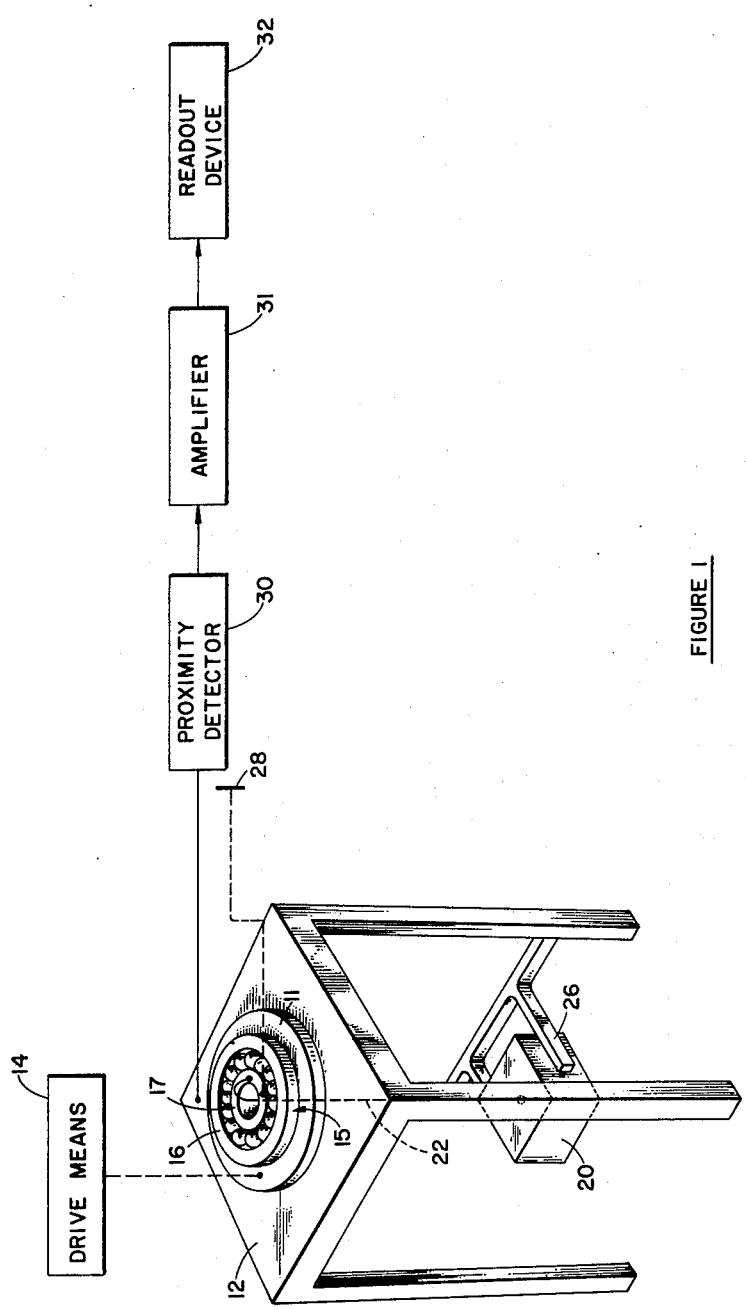

Aug. 17, 1965  B. J. McCOY  3,200,633
TORQUE TEST DEVICE
Filed Feb. 4, 1963  3 Sheets-Sheet 1

INVENTOR
BERNARD J. McCOY
BY
ATTORNEY

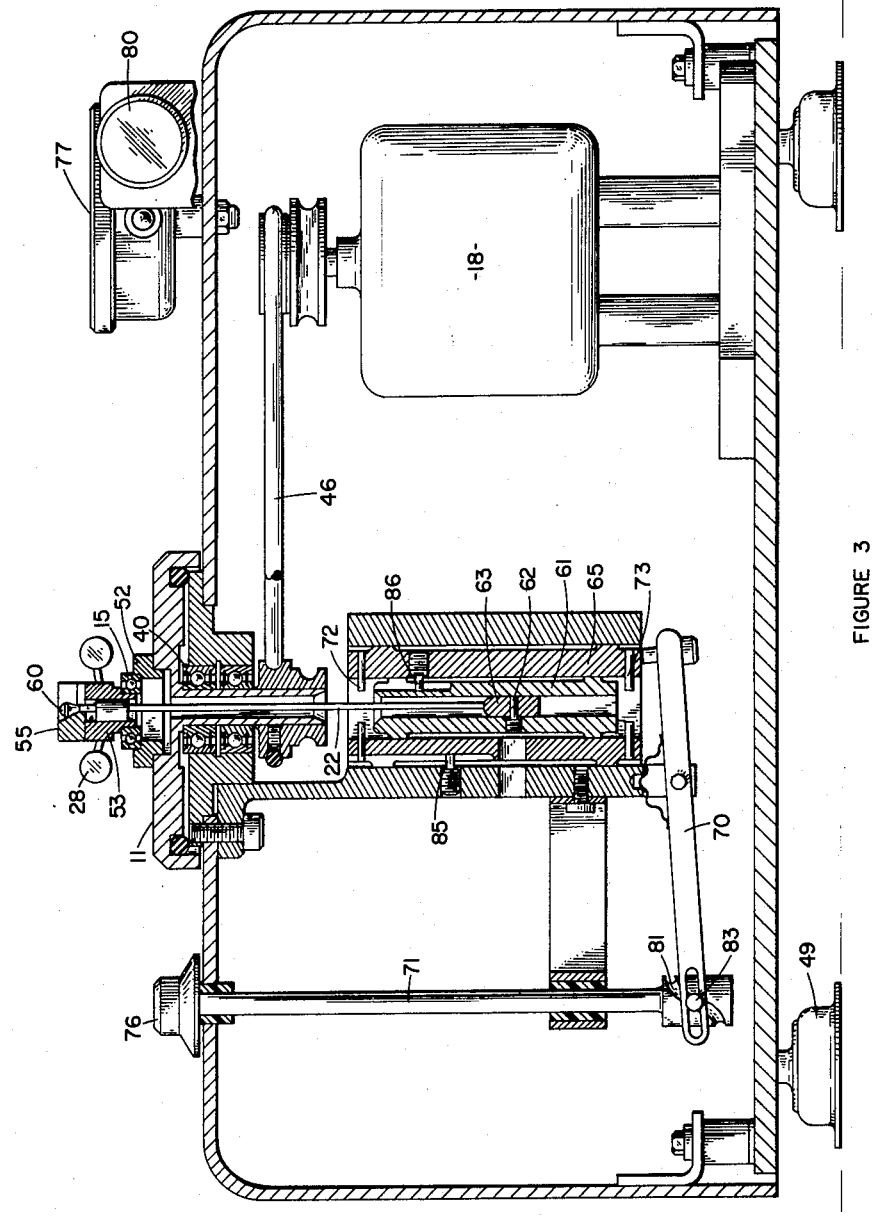

United States Patent Office 3,200,633
Patented Aug. 17, 1965

3,200,633
TORQUE TEST DEVICE
Bernard J. McCoy, Los Angeles, Calif., assignor to Tamar Electronics Industries Inc., Anaheim, Calif., a corporation of Delaware
Filed Feb. 4, 1963, Ser. No. 256,060
7 Claims. (Cl. 73—9)

This invention relates to a torque test device and more particularly to such a device capable of accurately measuring the coupling between two relatively movable members such as the races of a bearing.

It is necessary to the utilization of bearings in precision applications that the frictional characteristics of such bearings which may be defined in terms of the bearing breakaway torque be accurately determined. Close tolerance requirements for bearings which must be accurately verified are often imposed upon maufacturers of precision equipment for military applications.

Devices of the prior art for checking bearings have several drawbacks. Firstly, most of such prior art devices are overly complicated in their construction and method of utilization. This not only adds to their cost, but impairs their reliability and ease of operation. Many of the devices of the prior art have impaired accuracy due to the utilization of a "master" unit for calibration. Utilizing this calibration technique the accuracy of the instrument is necessarily limited by the true characteristics of the master utilized for calibration.

The device of this invention overcomes the shortcomings of prior art devices by providing simple yet highly accurate means for making the desired measurement. Precise calibration is achieved without the utilization of a master unit but rather by an internal calibration technique In the device of the invention which is suitable for checking the coupling between two relatively movable members which may be indicative of the breakaway torque of a roller ball bearing, means are provided for rotatably driving one of the members about the rotation axis. A weight having a predetermined mass is pendulously suspended from the other of the bearing members by a torsion bar. The weight is restrained from rotation about the bearing rotation axis and provides a predetermined thrust load on the bearing. The spring rate of the torsion bar is accurately predetermined. The rotatably supported bearing member is rotatably driven about the bearing axis and means are provided for detecting rotational displacement of the bearing member from which the mass is suspended. The detected displacement is a direct function of the coupling characteristics of the relatively movable members of the bearing. It is therefore an object of this invention to provide an improved test device for measuring the coupling between two relatively movable members.

It is a further object of this invention to provide a highly accurate torque test device of simple construction.

It is a further object of this invention to provide a bearing tester having higher reliability than prior art devices.

It is still a further object of this invention to facilitate the checking of the breakaway torque characteristics of bearings.

It is still another object of this invention to provide a bearing torque tester in which calibration can be achieved without the utilization of a master unit.

Other objects of this invention will become apparent from the following description taken in connection with the accompanying drawings of which, FIG. 1 is a schematic diagram illustrating the basic operation of the device of the invention.

Figure 2:
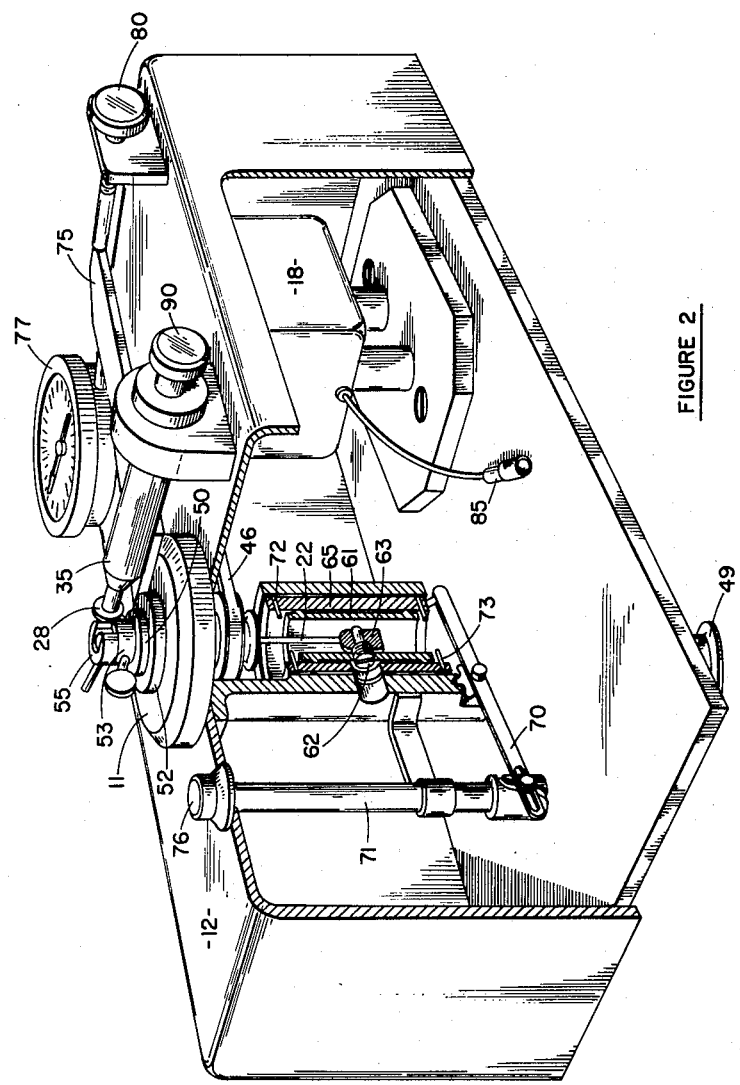

FIG. 2 is a perspective view of a preferred embodiment of the device of the invention while being calibrated, and FIG. 3 is a cross-sectional view of the embodiment shown in FIG. 2 shown while being used to test a bearing.

Referring now to FIG. 1, the basic operation of the device of the invention is illustrated. It is to be clearly understood that while the device of the invention is described for illustrative purposes in connection with means for checking the breakaway torque of a roller bearing that the inventive device can be utilized in any situation where a measurement of the coupling between two relatively movable members is desired. Plate 11 is rotatably supported on stand 12 on bearings (not shown). Drive means 14 which may comprise an electric motor is connected to plate 11 to drive it about its rotation axis.

A roller bearing 15, to be tested, having an outer race 16 and an inner race 17, is positioned so that its outer race 16 rests on plate 11. Plate 11 has an aperture at its center (not shown) so that inner race 17 does not rest on this plate. Weight 20 which has a predetermined mass is suspended from inner bearing race 17 by means of torsion bar 22 which is attached at ane end thereof to weight 20 and at the other end thereof to bearing race 17. Torsion bar 22 is fabricated of an elastic material and has a predetermined spring rate. A beryllium copper alloy has been found to be quite suitable. Stop means 26 are provided to prevent the pendulously suspended weight 20 from rotating about the rotation axis of bearing 15.

In checking the breakaway torque of bearing 15, drive means 14 is actuated to drive plate 11 at a rotation rate which may be, for example, 1–2 r.p.m. Outer race 16 of the roller bearing which rests on plate 11 is driven therewith about the plate's rotation axis which coincides with the rotation axis of the roller bearing. In view of the friction in the bearing, there will be some coupling between the outer race 16 and the inner race 17 which will result in some torque being imparted to the inner race. The magnitude of this torque is a direct function of the frictional characteristics of the bearing which is the quantity that is to be measured. In view of the fact that weight 20 is prevented from rotation by means of stop 26, torsion bar 22 will be twisted an amount which is directly in acccordance with the torque imparted to inner bearing race 17.

Precisely knowing the spring rate of torsion bar 22, the magnitude of this torque can be accurately determined as a function of the rotational displacement of bearing race 17. So, for example, if torsion bar 22 is chosen so that it has a spring rate of .5 gram centimeter per degree, then a rotational deflection of inner race 17 of 1 degree of arc will be indicative of an applied torque of .5 gram centimeter. Such a deflection will indicate that bearing under test 15 has a breakaway or starting torque of .5 gram centimeter under the thrust load provided by weight 20.

Proximity detector 30 is utilized to precisely measure the displacement of inner bearing race 17. Pick off plate 28 is connected to inner bearing race 17 so that it operates therewith. Proximity detector 30 generates an output signal precisely in accordance with the separation between pick-off arm 28 and a stator unit in the detector which is fixedly attached to stand 12. Proximity detector 30 may include any precision proximity pick-off of either the capacitive or inductive type. Highly accurate measurements have been achieved with a commercially available detector, the model D152 distance detector system available from the Bently Nevada Corp., Minden, Nevada. In this type of detector, the tank coil of a radio frequency resonant circuit is positioned in close proximity to pick off plate 28. The tuning of the tank is therefore varied in accordance with the separation between plate 28 and the coil. As is well known in the art, the D.C. current of a high "Q" radio frequency resonant circuit varies sharply with the tuning of the resonant circuit. Thus, a highly accurate variation of D.C. current in accordance with the displacement of plate 28 is obtained.

The output of displacement detector 30 is amplified by amplifier 31 which may be a conventional highly accurate D.C. amplifier and then fed to readout device 32. Readout device 32 may be a vacuum tube voltmeter, or the output information may be displayed on a device such as a pen recorder. In any event, readout device 32 will provide an indication of the precise rotational displacement of bearing race 17 which is determined by the breakaway or starting torque characteristics of the bearing under test.

Referring now to FIGS. 2 and 3 a preferred embodiment of the device of the invention is illustrated, FIG. 2 showing the device under calibration and FIG. 3 showing the device being utilized for testing a bearing. Plate 11 is rotatably mounted on stand 12 by means of ball bearings 40 (see FIG. 3). Plate 11 is rotatably driven by electric motor 18 operating in conjunction with drive belt 46. As already noted, plate 11 is normally driven at a rotation rate of 1–2 r.p.m. Stand 12 is mounted on vibration isolators 49 to minimize the effects of external vibrations on the operation of the instrument.

In the calibration of the instrument as shown in FIG. 2, a washer 50 is placed in receptacle 52 on plate 11. Resting on top of washer 50 is pick-off plate support 53 to which pick off plate 28 is attached. Resting on top of pick off plate support 53 is torsion bar keeper 55 from which torsion bar 22 is pendulously suspended. As can be seen in FIG. 3 such suspension is achieved by means of catch 60 which rides in a slot formed in keeper 55. An end of torsion bar 22 is attached to weight 61 by means of screw 62 which abuts against bob 63 which is attached to the end of the torsion bar.

Externally concentric to weight 61 is a second weight 65. With the end of lever bar 70 connected to control rod 71 in the fully up position, weight 65 is suspended from weight 61 on pins 72 to provide a total loading equal to the sum of weights 61 and 65. The weighting effects of weight 65 can be removed by rotating knob 76 to the position shown in FIG. 3 where the right hand end of bar 70 lifts weight 65 so that it is no longer hanging from weight 61 on pins 72. The entire load can be removed by rotating knob 76 fully thereby raising the opposite end of bar 70 up and bringing pins 73 up to a position where they support the full load of weight 61. This is done when placing a bearing in the device for test or putting a washer in place for calibration purposes.

Calibration is achieved as follows: Lever arm 75 is connected to plate 11 by means of a screw (not shown) which engages a threaded portion (not shown) of plate 11. Lever arm 75 is positioned so that it abuts against the actuator of displacement indicator 77 which may be an accurate lineal displacement indicator such as fabricated by the L. S. Starrett Co., Athol, Mass.

Lever arm 75 is displaced a known amount as read on displacement indicator 77 by rotating knob 80 which is threadably mounted on stand 12. Motor 18, of course, is not actuated during this calibration procedure. Plate 11 will be rotated in accordance with the displacement of lever arm 75 as measured by displacement indicator 77. Washer 50 directly transmits this displacement from plate 11 to torsion bar 22 through torsion bar keeper 55. Torsion bar 22 is therefore twisted a precise amount which is a function of the displacement measured by indicator 77. The amount of such rotational displacement is measured by pick-off 35 which senses relative motion of pick-off plate 28 which is in accordance with the rotation of torsional bar 22. The output of pick-off 35 is fed through cable 85 to detecting and readout means which includes proximity detector 30, amplifier 31, and readout device 32 as shown in FIG. 1. The gain of amplifier 31 is adjusted so that the signal indicated by readout device 32 is calibrated in terms of the known input displacement. The linearity of the output readings can be accurately ascertained by feeding in a range of known input displacements. By this technique the instrument can be very accurately calibrated before each use with a minimum amount of effort and without utilization of a master reference unit.

Referring now to FIG. 3, the actual breakaway torque measurement of a bearing is illustrated. In checking a bearing after calibration of the instrument, the lever arm 75 (FIG. 2) is first removed. Knob 76 is then turned fully counterclockwise to cause bar 70 to drive weight 65 upward so that weight 61 is supported on pins 73 and the load is completely removed from torsion bar 22. Under such conditions, grooved keeper 55 and pick-off plate support 53 can readily be removed and the bearing to be tested 15 placed in position. The keeper and support are then placed back in position as shown in FIG. 3 and the desired load placed on the inner race by the appropriate clockwise rotation of knob 76. It is to be noted that pin 83 is slidably mounted in the slot at the end of bar 70 and rides in helical groove 81. In the position shown in FIG. 3, a load consisting only of the inner weight 61 is provided. A greater load which includes both the outer weight 65 as well as the inner weight can be provided by turning knob 76 fully clockwise to drop the end of bar 70 abutting against weight 65 until this weight is being supported on weight 61 by means of pins 72.

With the desired weight as the case may be pendulously suspended on torsion bar 22 from the inner race of the bearing under test 15 and prevented from rotating by means of stop pins 85 and 86, pick-off 35 (see FIG. 2) is adjusted to "null" position by adjusting knob 90 to change the distance between the end of pick-off 35 and pick-off plate 28 until the reading on the readout device 32 (see FIG. 1) indicates the predetermined "null" position.

Motor 18 is then actuated to rotatably drive plate 11 on bearings 40. Rotation speeds of about 1 r.p.m. have been found to be satisfactory. With such rotation, a torque will be applied to the inner race of bearing 15 which is a direct function of the coupling between this inner race and the rotating outer race. This torque will be applied to torsion bar 22 which will be twisted in accordance therewith. The amount of resultant rotational displacement which is a function of the spring rate of the torsion bar will be sensed by the pickoff mechanism (see FIG. 2) and will produce a signal in accordance with the sensed signal at the readout device (FIG. 1).

It thus can be seen that a highly accurate measurement of the coupling between relatively moving members such as the races of a ball bearing can be made with the device of the invention. The device of the invention is both compact and relatively simple in construction as compared with prior art devices yet does not sacrifice any of the precision characteristics of such devices. Additionally, highly accurate calibration means is provided which enables rapid calibration utilizing a simple procedure.

While the device of the invention has been described and illustrated in detail, it is to be clearly understood that this is intended by way of illustration and example only and not by way of limitation, the spirit and scope of the invention being limited only by the terms of the following claims.

I claim:

1. A device for checking the breakaway torque of a roller bearing having inner and outer races comprising
   support means for supporting one of said races for rotation about an axis,
   means for rotatably driving said one of said races, means for selectively providing one of several predetermined load forces on the other of said races along said axis, said means for providing load forces including a torsion bar connected at one end thereof to the other of said races, means for selectively providing one of several predetermined loads on said torsion bar along said axis in a direction away from said races, and means for preventing the other end of said torsion bar from rotating about said axis, said means for selectively providing one of said loads on said torsion bar including a first weight pendulously suspendable from said bar, a second weight mounted slidably with respect to said first weight and in concentricity therewith, one of said weights having means thereon for pendulously suspending said one of said weights from the other of said weights, and selector control means for selectively lifting said one of said weights so that it is not suspended from the other of said weights, position pickoff means mounted on said support means for detecting rotation of said other of said races about said axis, and means connected to receive the output of said pickoff means for producing an output signal in accordance with the rotation of the other of said races.

2. The device as recited in claim 1 wherein said first weight is in internal concentricity with said second weight, said second weight being pendulously suspendable from said first weight.

3. The device as recited in claim 2 wherein said means for pendulously suspending said second weight from said first weight includes a plurality of pins extending inwardly from the top portion of said second weight.

4. The device as recited in claim 3, said second weight further having a plurality of pins extending inwardly from the bottom portion thereof, said selector control means being adapted to lift said second weight to support said first weight on the bottom pins of said second weight, thereby removing substantially all load from said torsion bar.

5. The device as recited in claim 4 wherein said selector control means includes a lever bar pivotally mounted on said support means and selector means connected to one end of said lever bar for pivotally positioning said lever bar to one of several predetermined positions, the other end of said lever bar being positioned against the bottom of said second weight.

6. In combination, a device for measuring the breakaway torque of a roller bearing having inner and outer races, said device including support means, a rotatable plate mounted on said support means adapted to support one of said bearing races, a force loaded torsion bar adapted to be connected to the other of said races and means for measuring the rotational displacement of said bar; and means for calibrating said device comprising means for tying said plate and said torsion bar together, a lever arm removably attached near one end thereof to said plate, actuator means mounted on said support means near the other end of said lever arm for selectively displacing said arm in a plane substantially normal to the rotation axis of said plate, and displacement indicator means mounted on said support means for measuring the displacement of said arm, whereby said lever arm is displaced a measured amount as indicated by said displacement indicator, thereby rotating said torsion bar a known amount to provide a calibration signal for said measuring means.

7. The device as recited in claim 6 wherein said means for tying said plate and said torsion bar together comprises a washer member and means for suspending said torsion bar from said washer member, said washer member being held to said plate and said torsion bar by the force of the torsion bar load.

References Cited by the Examiner
UNITED STATES PATENTS

| | | | |
|---|---|---|---|
| 2,441,608 | 5/48 | Warner | 73—133 |
| 2,867,113 | 1/59 | Mims | 73—9 |
| 2,887,875 | 5/59 | Curriston | 73—9 |
| 3,027,749 | 4/62 | Barnard | 73—9 |
| 3,041,867 | 7/62 | Knudsen | 73—9 |

RICHARD C. QUEISSER, *Primary Examiner.*